US005986811A

United States Patent [19]
Wohlstadter

[11] Patent Number: 5,986,811
[45] Date of Patent: Nov. 16, 1999

[54] METHOD OF AND APPARATUS FOR GENERATING A 3-D IMAGE FROM A 2-D IMAGE HAVING A CHANGEABLE FOCUSING MICRO-LENS ARRAY

[75] Inventor: Jacob N. Wohlstadter, Cambridge, Mass.

[73] Assignee: Meso Scale Technologies LLP, Gaithersburg, Md.

[21] Appl. No.: 08/476,854

[22] Filed: Jun. 7, 1995

[51] Int. Cl.⁶ .................................................. G02B 27/10
[52] U.S. Cl. .......................................... 359/626; 359/620
[58] Field of Search ................................... 359/619, 620, 359/621, 622, 623, 625, 626, 665, 666

[56] References Cited

U.S. PATENT DOCUMENTS

| | | | |
|---|---|---|---|
| 3,532,038 | 10/1970 | Rottmann | 359/619 |
| 3,657,981 | 4/1972 | Benton | 95/18 |
| 3,852,787 | 12/1974 | Nims et al. | 354/275 |
| 4,414,565 | 11/1983 | Shanks | 359/478 |
| 4,783,141 | 11/1988 | Baba et al. | 359/619 |
| 5,040,871 | 8/1991 | Davies et al. | 359/458 |
| 5,083,199 | 1/1992 | Borner | 358/88 |
| 5,132,839 | 7/1992 | Travis | 359/462 |
| 5,291,334 | 3/1994 | Wirth | 359/622 |
| 5,398,125 | 3/1995 | Willett | 359/41 |
| 5,439,621 | 8/1995 | Hoopman | 264/2.5 |
| 5,493,427 | 2/1996 | Nomura et al. | 359/40 |
| 5,499,138 | 3/1996 | Iba | 359/569 |
| 5,500,765 | 3/1996 | Eichenlaub | 359/463 |
| 5,504,597 | 4/1996 | Sprague | 359/40 |
| 5,905,593 | 5/1999 | Lo et al. | 359/463 |

OTHER PUBLICATIONS

Ives, Herbert E., 1931, "Optical Properties of a Lippmann Lenticulated Sheet," *Journal of the Optical Society of America* 21(3):171–176.

Yang et al., 1988, "Discussion of the Optics of a New 3–D Imaging System," *Applied Optics* 27(21):4529–4534.

Davies et al., 1988, "Three–Dimensional Imaging Systems: A New Development," *Applied Optics* 27(21):4520–4528.

Davies, et al., 1994, "Design and Analysis of an Image Transfer System using Microlens Arrays," *Optical Engineering* 33(11):3624–3633.

Kumar et al., 1994, "Patterned Condensation Figures as Optical Diffraction Gratings," *Science* 263:60–62.

Kumar et al., 1993, "Features of Gold Having micrometer to Centimeter Dimensions Can be Formed Through a Combination of Stamping with an Elastomeric Stamp and an Alkanethiol 'Ink' Followed by Chemical Etching," *Appl. Phys. Lett.* 63(14):2002–2004.

Kumar et al., 1994, "Pattering Self–Assembled Monolayers: Applications in Materials Science," *Langmuir* 10(5): 1498–1511.

Chaudhury et al., 1992, "How to Make Water Run Uphill," *Science* 256:1539–1541.

Abbott et al., 1994, "Potential–Dependent Wetting of Aqueous Solutions on Self–Assembled Monolayers Formed from 15–(Ferrocenylcarbonyl)pentadecanethiol on Gold," *Langmuir* 10(5):1493–1494.

(List continued on next page.)

*Primary Examiner*—Georgia Epps
*Assistant Examiner*—Ricky Mack
*Attorney, Agent, or Firm*—Whitman Breed Abbott & Morgan LLP

[57] ABSTRACT

Recent advances in surface techniques have lead to the development of extremely small (sub-micron) scale features. These techniques allow the formation of polymer microlenses as well as variable focus liquid lenses. The present invention primarily concerns the use of small scale lenses for the fabrication of novel displays which exhibit three-dimensional (3D) effects. Both still images and video images (or other motion images) can be generated.

6 Claims, 5 Drawing Sheets

OTHER PUBLICATIONS

Gorman et al., in press, "Control of the Shape of Liquid Lenses on a Modified Gold Surface Using an Applied Electrical Potential Across a Self–Assembled Monolayer," Harvard University, Dept. of Chemistry, 1995, Langmuir vol. 11 (6), pp. 2242–2246.

Liau et al., 1994, "Large–Numerical–Aperture Micro–lens Fabrication by One–Step Etching and Mass–Transport Smoothing," *Appl. Phys. Lett.* 64(12):1484–1486.

Jay et al., 1994, "Preshaping Photoresist for Refractive Micro–lens Fabrication," *Optical Engineering* 33(11):3552–3555.

MacFarlane et al., 1994, "Microjet Fabrication of Microlens Arrays," *IEEE Photonics Technology Letters* 6(9):1112–1114.

Stern et al., 1994, "Dry Etching for Coherent Refractive Micro–lens Arrays," *Optical Engineering* 33(11):3547–3551.

Kendall et al., 1994, "Micromirror Arrays using $KOH:H_2O$ Micromachining of Silicon for Lens Templates Geodesic Lenses, and Other Applications," *Optical Engineering*, 33(11):3578–3588.

Tipler, Paul A., *Physics for Scientists and Engineers*, Third Edition, Extended Version, Worth Publishers, pp. 982–984, Jul. 1991.

Missig, et al., 1995, "Diffractive Optics Applied to Eyepiece Design," *Applied Optics* 34(14):2452–2461.

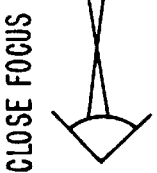
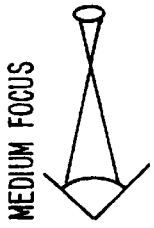
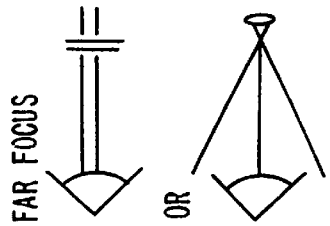
FIG. 2(c) CLOSE FOCUS / MEDIUM FOCUS / FAR FOCUS OR
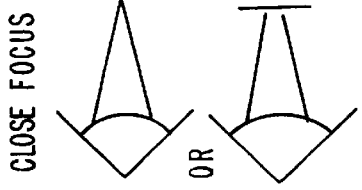
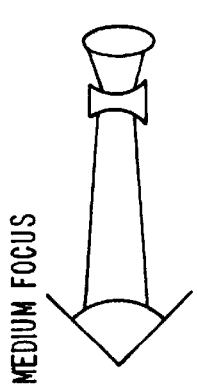
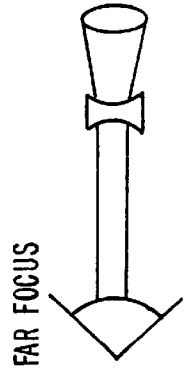
FIG. 2(b) CLOSE FOCUS OR / MEDIUM FOCUS / FAR FOCUS
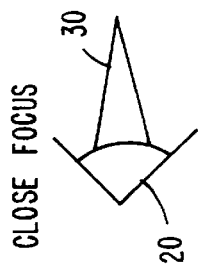
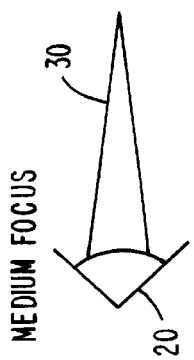
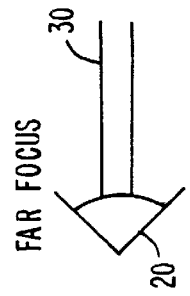
FIG. 2(a) CLOSE FOCUS / MEDIUM FOCUS / FAR FOCUS

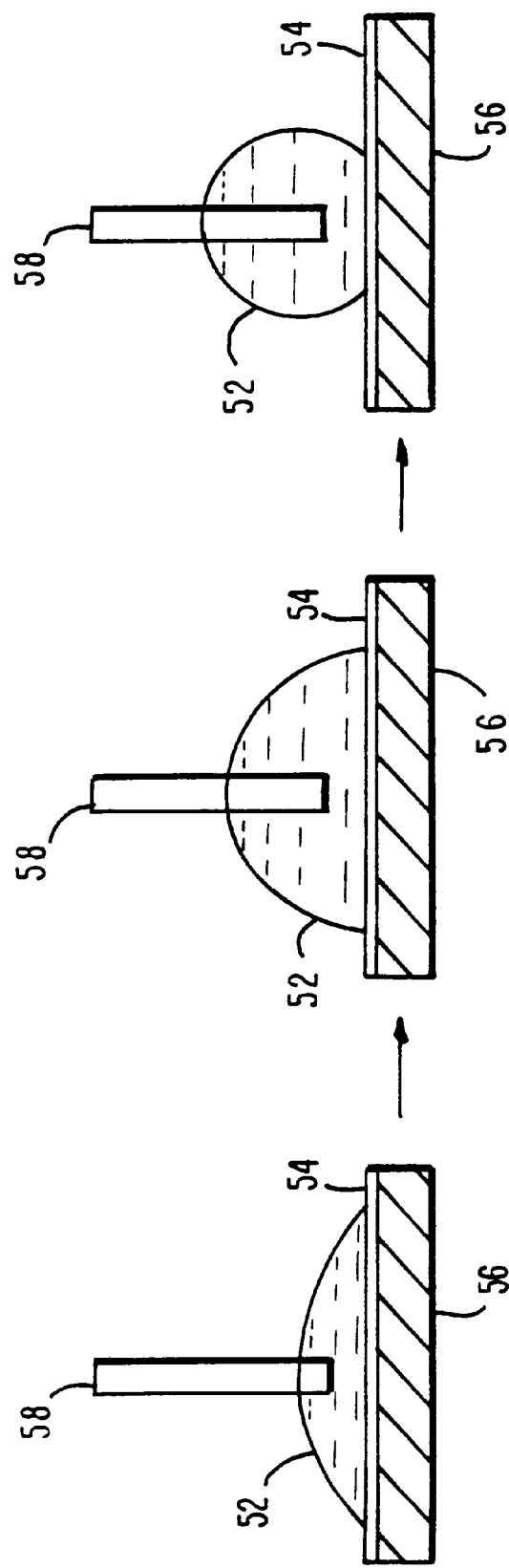

METHOD OF AND APPARATUS FOR GENERATING A 3-D IMAGE FROM A 2-D IMAGE HAVING A CHANGEABLE FOCUSING MICRO-LENS ARRAY

FIELD OF THE INVENTION

The present invention relates generally to optical systems, and more specifically to three dimensional imaging systems incorporating diffractive, refractive, or diffractive/refractive compound lenses.

BACKGROUND

Human Vision

Normal human vision provides a perception of space in the visual field of view that is in color and three dimensions (3D). A better realization of the optical requirements for a photographic system to present an acceptable 3D stereoscopic image or stereo-model to the viewer is given by an understanding of stereopsis, or visual perception of space.

The stimulus conditions for space perception are termed cues, and are in two groups. The monocular group allows stereopsis with one eye and includes relative sizes of subjects, their interposition, linear and aerial perspective, distribution of light and shade, movement parallax of subject and background and visual accommodation. The binocular group uses the two coordinated activities of both eyes: firstly, visual convergence, where the optical axes converge muscularly from parallel for distant vision to a convergence angle of 23° for a near point of 150 mm; and secondly, stereoscopic vision, where, due to the two different visual viewpoints, the imaging geometry gives two disparate retinal images for the left and right eyes. The disparities are due to parallax, the relative displacement of corresponding or homologous image points of a subject point away from the optical axis due to its position in the binocular field of view.

Retinal images are encoded for transmission as frequency modulated voltage impulses along the optic nerve, with signal processing taking place at the intermediate lateral geniculate bodies and then the visual cortex of the brain. The resultant visual perception is unique to the observer. For a further discussion of human 3D perception, see, e.g., Sidney F. Ray, "Applied Photographic Optics Imaging Systems For Photography, Film and Video," Focal Press, pp. 469–484, (1988), which is incorporated herein by reference.

3D Techniques

Many prior art 3D imaging systems use parallax to generate the 3D effect. Section 65.5 of Ray, cited above and which is incorporated herein by reference, provides a good description of several parallax-based techniques, such as 3D movies, stereo viewing of two side-by-side offset images, 3D post cards, etc. Although these parallax-only based systems offer some degree of 3D effect, they are discernably unrealistic.

Another well known, but far more complex technique for generating 3D images is holography. While holography can produce quite realistic 3D images, its use is quite limited because of the need for coherent light sources (such as lasers) and the darkroom or near darkroom conditions required to generate holograms.

One prior art technique for generating 3D images, known as integral photography, uses an array of small lenses (referred to as a fly's eye lens or a micro-lens array) to both generate and reproduce 3D images. The technique of integral photography is described in Ives, Herbert E., "Optical Properties of a Lippmann Lenticulated Sheet," *Journal of the Optical Society of America* 21(3):171–176 (1931).

Other techniques incorporating micro-lens arrays for the generation of 3D images are described in Yang et al., 1988, "Discussion of the Optics of a New 3-D Imaging System," *Applied Optics* 27(21):4529–4534; Davies et al., 1988, "Three-Dimensional Imaging Systems: A New Development," *Applied Optics* 27(21):4520–4528; Davies et al., 1994, "Design and Analysis of an Image Transfer System Using Micro-lens Arrays," *Optical Engineering* 33(11):3624–3633; Benton, Stephen A., 1972, "Direct Orthoscopic Stereo Panoramagram Camera," U.S. Pat. No. 3,657,981; Nims et al., 1974, "Three Dimensional Pictures and Method of Composing Them," U.S. Pat. No. 3,852,787; and Davies et al., 1991, "Imaging System," U.S. Pat. No. 5,040,871, each of which is incorporated herein by reference. A drawback of the above micro-lens array based 3D optical systems is that all lenses in the array have a fixed focal length. This greatly limits the type of 3D effects that can be generated by such arrays.

The Fabrication of Micro-Lens Arrays

Great advances in the generation of very small scale surface features have been made recently. Micro-stamping techniques using self assembling monolayers (SAMs) have allowed low cost production of features on sub-micron ($<10^{-6}$ m) scales.

Certain compounds, when placed in an appropriate environment, are capable of spontaneously forming an ordered two dimensional crystalline array. For example, solutions of alkane thiols exhibit this property on gold. Micro-stamping or micro contact printing uses a 'rubber' (silicone elastomer) stamp to selectively deposit alkane thiols in small domains on gold surfaces. A 'master' mold with the desired feature shapes and sizes is fabricated using optical lithographic techniques well known in the electronic arts. Poly(dimethylsiloxane) (PDMS), a silicone elastomer, is poured over the master and allowed to cure and then gently removed. The resulting stamp is then inked by brushing the PDMS surface with a solution of the appropriate alkane thiol. The PDMS stamp is then placed on a gold surface and the desired pattern of alkane thiols is deposited selectively as a monolayer on the surface. The monolayers may be derivatized with various head groups (exposed to the environment away from the metallic surface) in order to tailor the properties of the surface.

In this fashion, alternating domains, hydrophilic and hydrophobic, may be easily fabricated on a surface on a very small scale. Under appropriate conditions, such a surface, when cooled in the presence of water vapor, will selectively condense water droplets on the hydrophilic surface domains. Such droplets can act as convergent or divergent micro-lenses. Any shape lens or lens element may be produced. SAMs may be selectively deposited on planar or curved surfaces which may or may not be optically transparent. Offsetting, adjacent, stacked, and other configurations of SAM surfaces may all be used to generate complex lens shapes.

Using techniques similar to the SAM techniques discussed above, transparent polymers have been used to make stable micro-lenses. For example, a solution of unpolymerized monomers (which are hydrophilic) will selectively adsorb to hydrophilic domains on a derivatized SAM surface. At that point, polymerization may be initiated (e.g., by heating). By varying the shape of the derivatized surface domains, the amount of solution on the domain, and the solution composition, a great variety of different lenses with different optical properties may be formed.

For examples of optical techniques incorporating liquid optical elements and SAMs, see Kumar et al., 1994, "Patterned Condensation Figures as Optical Diffraction Gratings," *Science* 263:60–62; Kumar et al., 1993, "Features of Gold Having Micrometer to Centimeter Dimensions Can be Formed Through a Combination of Stamping With an Elastomeric Stamp and an Alkanethiol 'Ink' Followed by Chemical Etching," *Appl. Phys. Lett.* 63(14):2002–2004; Kumar et al., 1994, "Patterning Self-Assembled Monolayers: Applications in Materials Science," *Langmuir* 10(5):1498–1511; Chaudhury et al., 1992, "How to Make Water Run Uphill," *Science* 256:1539–1541; Abbott et al., 1994, "Potential-Dependent Wetting of Aqueous Solutions on Self-Assembled Monolayers Formed From 15-(Ferrocenylcarbonyl)pentadecanethiol on Gold," *Langmuir* 10(5):1493–1497; and Gorman et al., in press, "Control of the Shape of Liquid Lenses on a Modified Gold Surface Using an Applied Electrical Potential Across a Self-Assembled Monolayer," Harvard University, Department of Chemistry, each of which is incorporated herein by reference.

Micro-lens arrays can also be fabricated using several other well known techniques. Some illustrative techniques for the generation of micro-lens or micromirror arrays are disclosed in the following articles, each of which is incorporated herein by reference: Liau et al., 1994, "Large-Numerical-Aperture Micro-lens Fabrication by One-Step Etching and Mass-Transport Smoothing," *Appl. Phys. Lett.* 64(12):1484–1486; Jay et al., 1994, "Preshaping Photoresist for Refractive Micro-lens Fabrication," *Optical Engineering* 33(11):3552–3555; MacFarlane et al., 1994, "Microjet Fabrication of Micro-lens Arrays," *IEEE Photonics Technology Letters* 6(9):1112–1114; Stern et al., 1994, "Dry Etching for Coherent Refractive Micro-lens Arrays," *Optical Engineering* 33(11):3547–3551; and Kendall et al., 1994, "Micromirror Arrays Using $KOH:H_2O$ Micromachining of Silicon for Lens Templates, Geodesic Lenses, and Other Applications," *Optical Engineering* 33(11):3578–3588.

Focal Length Variation and Control

Using the micro-stamping technique discussed above, small lenses may be fabricated with variable focal lengths. Variable focus may be achieved through several general means, e.g., (i) through the use of electrical potentials; (ii) through mechanical deformation; (iii) through selective deposition, such as deposition of liquid water drops from the vapor phase (as described in Kumar et al., (Science, 1994) cited above); and (iv) heating or melting (e.g., structures may be melted to change optical properties, as in some micro-lens arrays which are crudely molded and then melted into finer optical elements).

The degree to which a solution wets or spreads on a surface may be controlled by varying the electronic properties of the system. For example, by placing microelectrodes within the liquid lens and varying the potential with respect to the surface, the curvature of the lens may be varied. See Abbott et al, cited above. In other configurations, hydrophobic liquid micro-lenses are formed on a surface and covered with an aqueous solution and the surface potential is varied versus the aqueous solution. Such systems have demonstrated extremely small volume lenses (1nL) which are capable of reversibly and rapidly varying focus (see Gorman et al., cited above).

Referring now to FIGS. 3(a)–3(c), schematic diagrams of a variable focus lens 50 is shown. Variable focus lens 50 includes a liquid lens 52 and two SAM surfaces 54. SAM surfaces 54 adhere to liquid lens 52. As can be seen in the progression from FIGS. 3(a) through 3(c), by varying the distance between the SAM surfaces 54, the shape, and therefore optical characteristics, of liquid lens 52 can be altered. There are also several other ways to vary the shape and optical characteristics of liquid lens 52. For example, the electrical potential between lens 52 and surface 54 can be varied, causing changes in the shape of lens 52, as is discussed further below with respect to FIGS. 4(a)–4(c). The index of refraction of lens 52 can be varied by using different liquid materials. The cohesive and adhesive properties of liquid lens 52 can be adjusted by varying the chemistry of the liquid material, and by varying the chemistry of surface 54. The three dimensional characteristics of surface 54 can be varied. For example, when viewed from the top or bottom surface 54 can be circular, rectangular, hexagonal, or any other shape, and may be moved up and down. These techniques may be used individually or in combination to create a variety of lens shapes and optical effects.

Referring now to FIGS. 4(a)–4(c), a schematic diagrams of an electrically variable focus lens as disclosed in the above cited Abbott et al. article is shown. A drop of liquid 52 is placed on SAM surface 54, which is in turn formed on metallic surface 56, preferably gold. By varying the electric potential between microelectrode 58 and SAM surface 54, the curvature (and thus optical characteristics) of liquid lens 52 can be varied. The progression from FIGS. 4(a) to 4(c) shows schematically how the shape of liquid lens 52 can be changed. Similar effects can be achieved using the techniques described in the above Gorman et al. article, although microelectrodes 58 need not be used.

Alternatively, such micro-lenses may be focused through mechanical means. For example, flexible polymeric or elastomeric lenses may be compressed or relaxed so as to vary focus through piezoelectric means. Alternatively, liquid lenses encapsulated in flexible casings may be mechanically compressed or relaxed.

SUMMARY OF THE INVENTION

The present invention provides a 3D optical system which, in contrast to the prior art, includes a variable focus micro-lens array and an image that appears to have been taken with an optical system having a relatively high depth of field; that is, objects of varying distances within the image are substantially in focus over a predetermined area. In an alternative embodiment, variable focus micro-lens arrays can be used in combination with still or motion images to cause the apparent distance of the image to change.

Another embodiment uses fixed arrays having elements with varying focal lengths to create 3D and other optical effects.

DESCRIPTION OF THE FIGURES

FIGS. 2(a) (1)–2(c) (3) are schematic diagrams showing the path of light directed to an observer under various conditions.

FIGS. 4(a)–4(c) are schematic diagrams showing another technique for varying the focal length of a liquid micro-lens through the use of SAMs.

DETAILED DESCRIPTION

Figure 1:
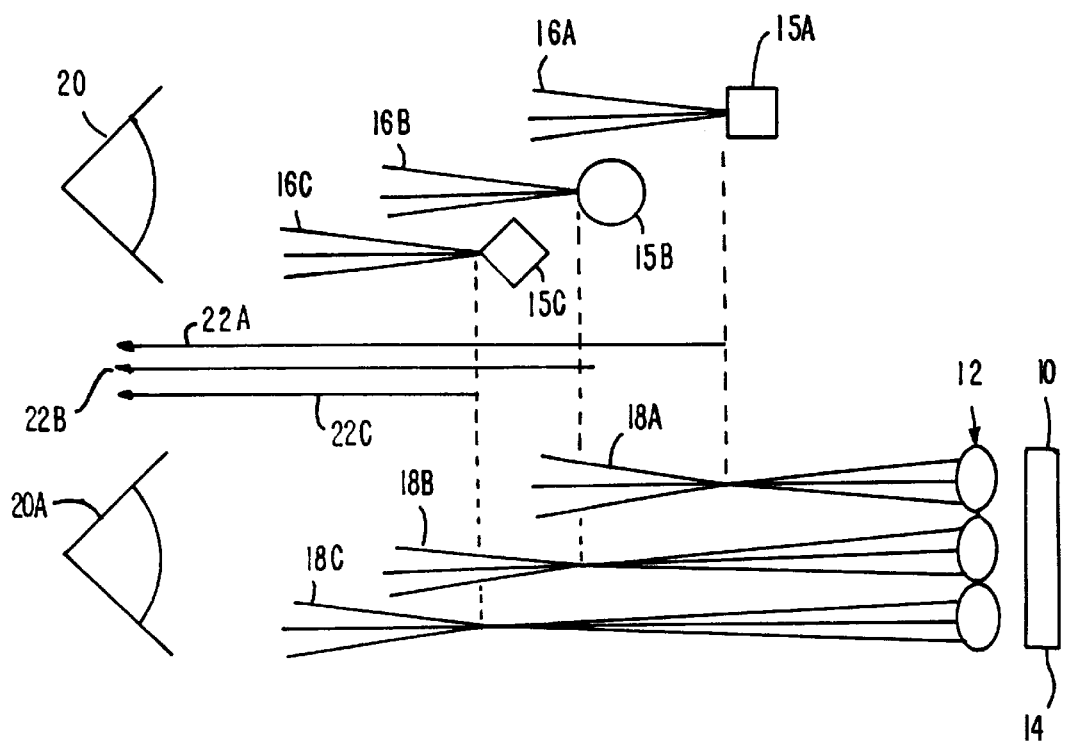
FIG. 1 is a schematic diagram showing a 3D imaging system incorporating a micro-lens array according to a preferred embodiment.
Figures 3A, 3B, 3C:
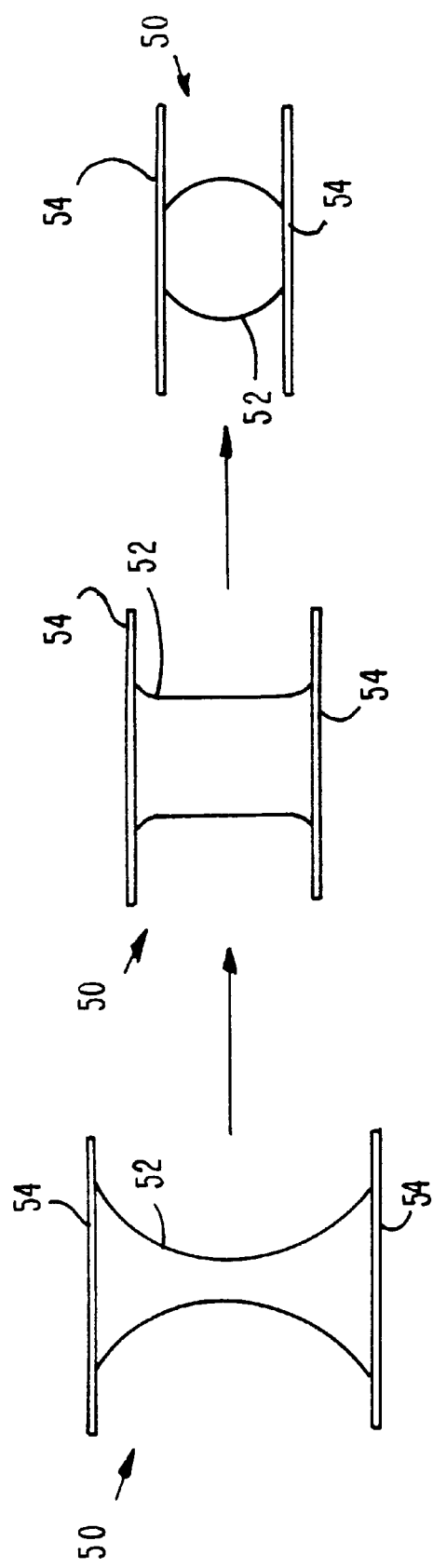
FIGS. 3(a)–3(c) are schematic diagrams showing one technique for varying the focal length of a liquid micro-lens through the use of SAMs.

The structure and function of the preferred embodiments can best be understood by reference to the drawings. The reader will note that the same reference numerals appear in multiple figures. Where this is the case, the numerals refer to the same or corresponding structure. In a preferred embodiment, variable focus micro-lens arrays, such as those fabricated using the techniques discussed above, along with still or motion images having relatively great depth of field, are used to create 3D effects.

Referring to FIGS. 2(a) (1)–2(a) (3), images viewed by the human eye comprise a plurality of extremely fine points which are perceived in continuous detail. As light falls on each object point, the light is scattered and the point diffusely reflects a cone of light 30 (i.e., light which subtends some solid angle) outward. If an object is viewed at a considerable distance, by an observer 20, then a very small portion of cone 30 is collected; and the rays of light that are collected are nearly parallel (see FIG. 2(a) (1): far focus). As the viewing distance decreases, however, the rays collected by the eyes of observer 20 are less parallel and are received at greater diverging angles (see FIGS. 2(a) (2) and 2(a) (3); medium focus and close focus). The complex of the cornea and lenses changes shape so that objects at varying distances can be focused. For a more complete discussion of diffuse reflection of the type discussed above, see, e.g., Tipler, Paul A., *Physics for Scientists and Engineers,* Third Edition, Extended Version, Worth Publishers, pp. 982–984, which is incorporated herein by reference.

According to a preferred embodiment, a two dimensional photograph or image which is in focus at all points of the image is overlaid with an array of micro-lenses. With proper illumination, such a system can generate light cones of varying divergence and simulate 3D space.

Because photographic lenses only have one primary point of focus, there is only one plane in the photograph which is in exact focus; in front of and behind this plane the image is progressively out of focus. This effect can be reduced by increasing the depth of field, but can only be corrected to a certain extent.

In general, a preferred embodiment of the present invention will work with images generated using an optical system having a large depth of field. For certain images, proper placement of the plane of focus and use of depth of field is adequate to attain perceived sharpness throughout the entire image. In other situations, more advanced techniques are required to attain perceived exact focus for all points within an image. Modified cameras and/or digital imaging techniques may be used. For example, some out of focus areas within an image may be focused using digital software 'sharpening' filters.

Figure 5:
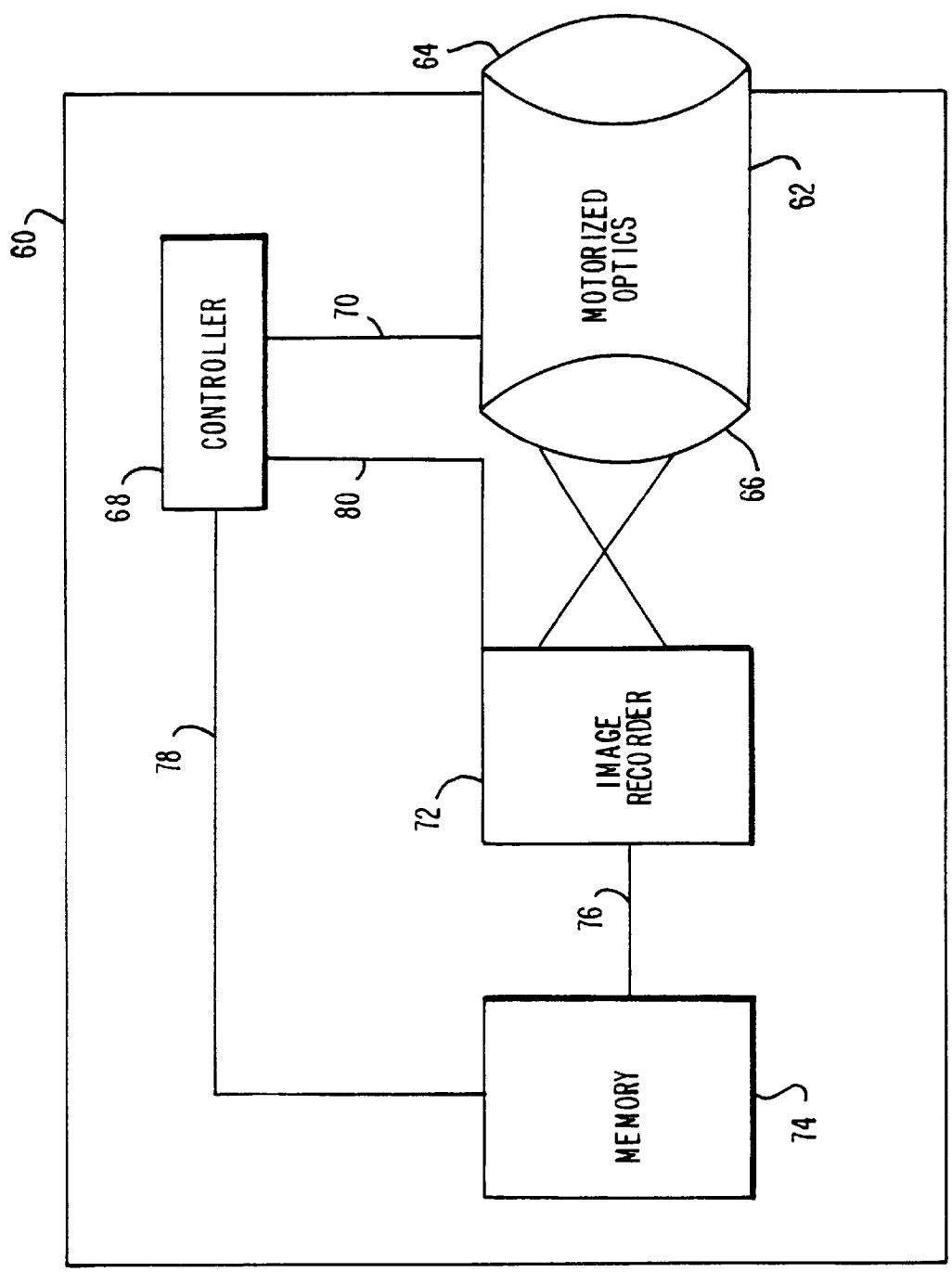
FIG. 5 is a block diagram of a camera used to make two dimensional images of the type used in a preferred embodiment.

Referring now to FIG. 5, a block diagram of a camera 60 used to make two dimensional images of the type used in a preferred embodiment is shown. Camera 60 includes conventional motorized optics 62 having an input lens 64 and an output lens 66. While lenses 64 and 66 have been depicted as convex lenses, those skilled in the art will understand that lenses 64 and 66 may be of any desired configuration. Motorized optics 62 focuses an image on image recorder 72. An image can also be focused on image recorder 72 by varying the distance between image recorder 72 and output lens 66 either independently, or in combination with adjustments in motorized optics 62. Image recorder 72 may be a charge coupled device (CCD), photomultiplier tube (PMT), photodiode, avalanche photodiode, photographic film, plates, or other light sensitive materials. In addition, image recorder 72 may be a combination of any of the above light recording or collecting devices.

The focus of motorized optics 62 is controlled by controller 68, which is coupled to motorized optics 62 via control line 70. Controller 68 may be a microprocessor, micro-controller, or any other device which generates a digital or analog signal that can be used to control the focus of motorized optics 70.

If image recorder 72 is a digital device, then images captured by image recorder 72 are stored in memory 74.

If image recorder 72 is a photographic or light sensitive material, then memory 74 is not needed.

Memory 74 may be semiconductor memory, magnetic memory, optical memory, or any other type of memory used to store digital information. Image recorder 72 is coupled to memory 74 via data line 76. Controller 68 may also control memory 74 and Image recorder 72 via control lines 78 and 80.

Through the operation of camera 60, a collage of sharp areas may be formed to make an image which is sharp at all points. For example, a series of digital images of the same scene may be captured with Image recorder 72, each focused at a different distance. That is, controller 68 causes motorized optics 64 to cycle through a range of focuses (e.g., from 5 meters to infinity), image recorder 72 captures images of a scene taken at different focuses, and memory 74 stores the captured images. The focus of motorized optics 64 can be varied continuously, or in steps, depending on conditions and the image required.

And further depending on conditions and the image required, one to many hundreds of images may be captured. For example, if the image is entirely of a distant horizon, only a far focus image would be required. Therefore, the overall shutter speed may be very short.

Camera 60 may be a still camera or a video camera. Controller 68 can be used to sequence motorized optics 64 through any range of focuses, as the desired range of focuses may change with the type of scene and lighting conditions. If camera 60 is used as a video camera, motorized optics 64 must be made to operate very quickly, as several frames (each including several images taken at different focuses) per second must be captured. To save time, controller 68 could be programmed to cycle motorized optics 64 from the closest desired focus to the furthest desired focus to capture the images required to generate one frame, and then cycle motorized optics 64 from the furthest desired focus to the closest desired focus to capture the images required to generate the next frame. This process could then be repeated for all subsequent frames.

The same segment of the scene in each of the digital images stored in memory 74 (say a 5×5 pixel array) may be sampled for contrast (the highest contrast corresponds to the sharpest focus). Each 5×5 high contrast segment may then be assembled into a single image which will be substantially in focus over the entire scene. This may be done with more advanced software algorithms which will recognize "continuous shapes" or objects to simplify the process and make it more rapid. The manipulation is most easily carried out in digital form (either from digitized analog originals or from digital originals) but may also be done in an analog format (cut and paste).

Referring now to FIG. 1, a preferred embodiment of the present invention is illustrated. Objects 15A–15C represent the position of several objects in space as perceived by a viewer 20. Objects 15A–15C are distances 22A–22C, respectively, away from viewer 20. Objects 15A–15C also reflect light cones 16A–16C towards viewer 20. As discussed above, the degree to which a light cone 16 is diverging when it reaches viewer 20 varies with the distance of an object 15 from viewer 20. To recreate a 3D image of objects 15A–15C, an image 10 (which is preferably perceived as sharp over its entire area) is placed in registered alignment with an array 12 of micro-lenses 14. However, the preferred embodiment can also operate on an image 10 that is not sharp at each point.

Array 12 can be a substantially flat two dimensional array, or it can be an array having a desired degree of curvature or shape, which depends on the curvature or shape of image 10. The characteristics of each micro-lens 14 corresponding to each point or pixel on image 10 are chosen based on the focus distance of the camera lens which made that point or pixel of the image sharp. The focal lengths of the micro-lenses 14 may be chosen so that light cones 18A–18C duplicate light cones 16A–16C (based on the expected or known viewing distance from the micro-lenses, or based on a relative scale or an arbitrary scale to vary the perceived image). In this respect, viewer 20A will see the same 3D image seen by viewer 20.

Since image 10 can be viewed as a coherent 2D image when viewed by itself, the appearance of image 10 can be made to vary or alternate between 2D and 3D. If 2D viewing is desired, lenses 14 in array 12 can either be removed, or can be adjusted to be optically neutral. If 3D viewing is desired, lenses 14 in array 12 can be adjusted as described above.

A similar procedure may be utilized to produce 3D motion pictures/video. As is known to those skilled in the art, motion video is achieved by rapidly displaying images in sequential fashion. Therefore, sequential images in focus over the entire image (or to the degree desired) must be created. To achieve this, a video camera which is made to rapidly and continuously cycle between near and far focus is used. Each overall sharp image is produced by the techniques discussed above (utilizing depth of field, knowledge of the scene, collage techniques, etc.). Further, intelligent software can be used in combination with still or video cameras to optimize depth of field, number of focus steps on a focus cycle, etc., based on ambient conditions, previously inputted preferences, and/or the past (immediately prior or overall past history) appropriate settings. Additional software/hardware manipulation can be used to make sharp images over the entire scene or to the degree desired. For example, the periphery of a scene may be selectively out of focus.

Although the overall field of view of the human eye is large, the brain focuses on a central portion and the periphery is often substantially out of focus. In the ideal case the image behind the micro-lens array is sharp over the entire scene so that as the viewer examines different portions of the scene each will come into focus as the viewer focuses properly. There are, however, situations in which sharpness over the entire image is not needed, such as in video sequences when the viewer only follows a particular field within a scene.

Once the desired video images are captured, 3D display is achieved by placing the images behind an array 12 of variable focus lenses 14, as discussed above with respect to FIG. 1. In each frame in the video sequence, for each point or pixel of the frame there is a corresponding focus setting for the lens 14 which is in register with that pixel. As each frame is sequentially displayed each pixel varies its focus to the appropriate predetermined setting for the pixel of that frame.

Since each point or pixel has with it an associated lens or compound lens, the rays from each pixel can be controlled to reach the eye at a predetermined angle corresponding to the 3D depth desired for that pixel. There may be multiple lens designs which may suit the desired effect for any given situation.

Referring again to FIGS. 2(a) (1)–2(a) (3) an important consideration in the operation of the present invention is the eye to pixel distance. Different lens designs are required for close screens such as goggles (see FIGS. 2(b) (1)–2(b) (3)) than are required for more distant screens (see FIGS. 2(c) (1)–2(c) (3).

As is depicted in FIGS. 2(b) (2) and 2 (b) (3) (medium and far focus), there are situations where combinations of elements (such as a positive and a negative lens) can be moved relative to each other to create the desired optical effect. Thus, in one embodiment, multiple arrays could be moved relative to each other to create the proper light output. For a more complete description of the properties of combinations of optical elements, see, e.g., Ray (cited above), pp. 43–49, which is also incorporated herein by reference.

Consider the analogous behavior of a point of diffuse reflection and a point of focus from a lens; if both the point of focus and the point of reflection are at the same distance from the eye, the angle of the rays upon reaching the eye will be the same. Because the pupil of the eye is relatively small, about 5 mm, only a small fraction of the diffusely reflected light cones are observed by the eye, and one does not need to "recreate" rays which are not observed by the eye.

The above described techniques may be used for display screens such as television, video, video cameras, computer displays, advertising displays such as counter top and window displays, billboards, clothes, interior decorating, fashion watches, personal accessories, exteriors, camouflage, joke items, amusement park rides, games, virtual reality, books, magazines, postcards and other printed material, art, sculptures, lighting effects which cause light to become more intense or diffuse, as may be desired in photographic or home use applications, and any other applications where three dimensional or variable optical effects are desired.

Computer displays are typically placed close to a user, and the user's eyes are constantly set at a single distance which puts strain on the eye muscles. To prevent eyestrain and long-term deleterious effects, it is recommended that one periodically look at distant objects. By using the present invention, a lens array can be adjusted so that the viewer can focus near or far to view the display. Such variation in apparent viewing distance (the display itself may be kept at the same distance) may be manually user controlled, or may follow a predetermined algorithm (such as slowly and imperceptibly cycling but moving through a range to prevent strain). Such algorithms may also be used for therapeutic purposes. The viewing distance may be modulated to therapeutically benefit certain muscle groups. The technique may be used for books as well as other close-field intensive work.

One application of the still 3D images, according to the present invention, would be in the field of fine art and collectibles. Moreover, still images may be paired with fixed focal length lens arrays as well as variable focus arrays. Unique effects can be achieved by modulating the focal length of the lenses in conjunction with a still image. Eccentric art as well as eye-catching displays or advertisements could be achieved by undulating the focus of a still image. In particular, this technique can be used to guide the viewer's attention to particular portions of an image by selectively modulating the apparent viewing area of interest and leaving the rest of the image static—or vice versa, or alter the focus of a region and its apparent size. For example, if the size of an object (in terms of its percentage of an observer's field of view) stays the same, and the observer's eye switches from near focus to far focus, then the observer's sense of how large the object is will change (i.e., the observer will perceive the object as being bigger). Similarly, if the size of an object (in terms of its percentage of an observer's field of view) stays the same, and the observer's eye switches from far focus to near focus, then the observer will perceive the object as being smaller). This effect is further aided by including "reference" images—images of objects of known size. Therefore, such a screen could selectively cause changes in apparent size, for example, to grab the observer's attention.

Wrap-around, or all encompassing views are advantageous because they eliminate distracting non-relevant peripheral information and images. There are two general techniques for giving the viewer an all encompassing view of a scene. The first is to use extremely large and/or curved viewing screens most useful for group viewing (e.g. the Sony IMAX theaters or a planetarium). The second technique is the use of individual viewing goggles or glasses. In this technique relatively small screens are placed close to the eyes. An advantage to using the micro-lenses is that even at very close distances, it is difficult for the average person to discern features of less than 100 microns—so if the microlenses in the array are made small enough (but are large enough so that unwanted diffraction effects do not predominate) the screen can remain virtually continuous without pixel effects. Because the screens are small, reductions in cost to achieve the wrap-around all encompassing views are achieved. Additionally, it is possible to use blackened areas around the screen if the screen does not fill the entire viewing angle so as to remove distractions. Alternatively, some applications would advantageously incorporate external visual images. For example, a partially transparent display could overlap images from the environment with displayed images (this can be used in other embodiments such as heads up displays). Such displays could have military as well as civilian use. In particular, information can be displayed to operators of moving vehicles. When using goggles, such displays could be visible to one eye or both.

If a computer display were generated within wrap-around goggles, the effective screen size would be maximized. There is a trend towards increasing monitor sizes for computers as the total information/number of computer applications simultaneously running increases. A wrap-around goggle computer display would allow the user to use his entire field of vision as a desktop. This could be combined with 3D effects as well as the strain reducing features described above.

Additionally, goggles may have one screen for each eye. Such goggles would require appropriate parallax correction so that the two images coincide and are perceived as a single image by the viewer. An advantage of using two screens is that the individual screens may be placed very close to their respective eyes. The two images of different parallax may be obtained from a variety of modified camera systems (see Ray, FIG. 65.10, Section 65.5 (cited above)). Alternatively, software algorithms may be used to generate second images from single views with altered parallax. Two screen goggles may also be used without parallax corrected images—that is, with the same perspective displayed to both eyes. This would likely result in some loss of natural 3D effect. However, many factors contribute to 3D effects, of which parallax is only one.

Referring again to FIG. 1, the display 10 behind the lens array 12 may be analog or digital, and it may be printed, drawn, typed, etc. It may be a photograph or transparency, in color or black and white, a positive or negative, inverted or offset by any angle or properly oriented in its original fashion—it may emit or reflect light of many different wavelengths visible or non-visible. It may be lithograph, sequential cinematic images and may be an XY plane in two or three dimensions. It may be a CRT, LCD, plasma display, electrochromic display, electrochemiluminescent display or other displays well known in the art.

Lenses 14 in array 12 may vary in terms of:

Size; preferably ranging from 1 cm to 1 micron.

Shape; preferably circular, cylindrical, convex, concave, spherical, aspherical, ellipsoid, rectilinear, complex (e.g. Fresnel), or any other optical configuration known in the art.

Constitution; the lenses may be primarily refractive, primarily diffractive, or a hybrid diffractive-refractive design, such as the design disclosed in Missig et al., 1995, "Diffractive Optics Applied to Eyepiece Design," Applied Optics 34(14):2452–2461, which is incorporated herein by reference.

Number of lenses in the array; the arrays may range from 2×2 to a virtually unlimited array, as the lens array 12 could be in the form of a very large sheet.

The number of lens elements used for each 'pixel'; as is known in the art, compound lenses may be useful for correcting optical aberrations and/or useful for different optical effects. For example, spherical or chromatic aberrations may be corrected and zoom lens optics may be incorporated into an array. Moreover, one could use a fixed focus array in front of a display and then a zoom array on top of the first array. Or in different applications different optical element designs could be incorporated into the same array.

Color of the lenses; the lenses may be colored or colorless and may be transparent to a variety of visible and non-visible wave lengths. For example, stacked arrays of red, green, and blue lenses may be used. Alternatively, colored display pixels could be used with non-colored lenses.

Composition of the lenses; as discussed above, the lenses may be composed of a variety of materials in a variety of states. The lenses may be liquid solutions, colloids, elastomers, polymers, solids, crystalline, suspensions etc.

Lens compression, relaxation, and deformation; the lenses may be deformed by electrical and/or mechanical (e.g. piezoelectric) means. Deformation may be employed to control effective focal length and/or to vary other optical properties of the lens or lens system (e.g. aberrations or alignment—alignment may be between lenses and/or alignment with the display)

Finally, arrays may be combined or stacked to vary or increase different optical properties. The arrays can be curved or flat.

Many other various elements can be included in the preferred embodiments. For example, filters may be used in the arrays, between the array and the display, and in front of the array. Such filters may be global, covering all or most pixels, or may be in register with only one pixel or a select group of pixels. Of particular note are neutral density filters (e.g. an LCD array). Other filters include color filters, gradient filters, polarizers (circular and linear) and others know to those skilled in the art.

Further, the surfaces of the different components of the invention may be coated with a variety of coatings, such as, antiglare coatings (often multilayer). Other coatings provide scratch resistance or mechanical stability and protection from environmental factors.

Light baffling structures or materials may be used to prevent unwanted stray light or reflections. For example, it may be desirable to isolate each pixel optically from neighboring pixels. In one embodiment, SAMs may be used to form micro light baffles. For example, micro-lenses which occupy hydrophilic regions may be circumscribed by hydrophobic regions whose surfaces are selectively occupied by light absorbing material. Alternatively, micro-machined light baffle structures may be used.

The components of the invention may advantageously have varying optical properties. For some applications substantially transparent components and support materials would be used—e.g. for use in a heads up display. In other cases, mirrored surfaces may be desirable—e.g. as a backing to maximally utilize reflected light and also for the use of mirrored optical elements. Other materials include semi-transparent mirrors/beam splitters, optical gratings, Fresnel lenses, and other materials known to those skilled in the art.

Shutters and/or apertures may be placed in various locations the system and may be global or specific (as the filters above). Shutters may be useful, for example, if a film based cinematic video scene were used as the display. Apertures could be used to vary light intensity and depth of field.

The overall systems may vary in size between a few microns and hundreds of meters or more. The system may be curved or flat. It may be a kit. It may be a permanent installation or it may be portable. Screens may fold or roll for easy transportation. The screens may have covers for protection and may be integrated into complex units (e.g. a laptop computer). The system may be used in simulators and virtual reality systems. The system can be used as a range finder by correlating effective focus on the array with a plane of focus in the environment. The system may be used for advanced autofocus systems. For example, the system could be used to rapidly find optimal focus since the micro-lens can focus much faster than a large mechanical camera lens and then the lens can be set to the accurate focus. The system can be used for directional viewing of a display—for example by using long effective focal lengths. The systems may also be disposable.

An important consideration in the present invention is the type and direction of lighting. The lighting may be from the front (reflected) or from the rear (backlit) and/or from a variety of intermediate angles. There may be one light source or multiple light sources. In some cases both reflected and luminous backlighting are desirable to more accurately represent a scene. For example, when indoors looking out a window, one may perceive strong backlighting through the window and reflected softer light with directional shadows within the room. Combining backlight, reflected light and the intensity/neutral density filtering will give a more realistic image. Directional reflected light may be focused on a single pixel or specific area or may be global (as with backlighting). The light may be filtered, polarized, coherent or non-coherent. For example, the color temperature of sunlight varies through the day. A sunlight corrected source light could then be filtered to represent the reddish tones of a sunset image etc. The light may be placed in a variety of positions (as with the filters above) and may be from a variety of known light sources to one skilled in the art including incandescent, halogen, fluorescent, mercury lamps, strobes, lasers, natural sunlight, luminescing materials, phosphorescing materials, chemiluminescent materials, electrochemiluminescent etc. Another embodiment is that of luminescing lenses. Liquid lenses or lenses which may be suitably doped with luminescent materials may be useful, especially in disposable systems. For example, consider a liquid phase lens resting on an electrode. Such a lens (if it contained an ECL tag) could be caused to luminesce.

The present invention has been described in terms of a preferred embodiment. The invention, however, is not limited to the embodiment depicted and described. Rather, the scope of the invention is defined by the appended claims.

What is claimed is:

1. A method for generating a three-dimensional image from a two-dimensional image having a plurality of image points, comprising the step of: passing light from said two-dimensional image through an array of micro-lenses and thence to a viewer, light from each of said image points passing through one or more micro-lenses in alignment therewith to thereby control the apparent distance of said image points from said viewer thereby generating said three-dimensional image from said two-dimensional image for perception by said viewer, wherein said array includes at least one micro-lens having a changeable focal length.

2. A method for generating a three-dimensional image from a two-dimensional image having a number of image points, comprising the steps of:

(a) passing light from said two-dimensional image through an array of micro-lenses and thence to a viewer, light from each of said image points passing through one or more micro-lenses in alignment therewith, wherein said array includes at least one micro-lens having a changeable focal length, (b) varying (i) the distance of said two-dimensional image from said array, and/or (ii) the distance of said array from said viewer, and/or (iii) the focal length of each of said micro-lenses, thereby controlling the apparent distance of said image points from said viewer thereby generating said three-dimensional image from said two-dimensional image for perception by said viewer.

3. A method as recited in claim 2,, wherein said three-dimensional image appears continuous to said viewer.

4. An imaging system for creating a three-dimensional image from a two-dimensional image having a plurality of image points, comprising:

(a) an array of micro-lenses, a plurality thereof having a variable focal length; and (b) means for holding at least one micro-lens in said array in alignment with one or more image points in said two-dimensional image; wherein said array of micro-lenses creates said three-dimensional image from said two-dimensional image.

5. An imaging system for creating a three-dimensional image from a two-dimensional image having a plurality of image points, comprising:

(a) an array of micro-lenses, a plurality thereof having a variable focal length;

(b) means for holding at least one micro-lens in said array in alignment with one or more image points in said two-dimensional image; and (c) means for varying the distance between said array and said two-dimensional image;

wherein said array of micro-lenses creates said three-dimensional image from said two-dimensional image.

6. An imaging system for creating a three-dimensional image from a two-dimensional image having a plurality of image points, comprising:

(a) an array of micro-lenses, a plurality thereof having a variable focal length;

(b) means for holding at least one micro-lens in said array in alignment with one or more image points in said two dimensional image;

(c) means for varying the distance between said array and said two-dimensional image; and (d) means for varying the distance between said array and a viewer of said three-dimensional image; wherein said array of micro-lenses creates said three-dimensional image from said two-dimensional image.

* * * * *